United States Patent

[11] 3,610,438

[72] Inventor Everett W. Opdahl
Lutherville, Md.
[21] Appl. No. 19,654
[22] Filed Mar. 16, 1970
[45] Patented Oct. 5, 1971
[73] Assignee Westinghouse Electric Corporation
Pittsburgh, Pa.

[54] MANIPULATOR ARM
5 Claims, 6 Drawing Figs.
[52] U.S. Cl..................................................... 214/1 CM,
214/147 T
[51] Int. Cl....................................................... B25j 1/02
[50] Field of Search............................................ 214/1 CM,
147 T

[56] References Cited
UNITED STATES PATENTS
3,422,965 1/1969 Lloyd............................ 214/1 CM FOREIGN PATENTS
1,481,819 10/1966 Germany..................... 214/1 CM Primary Examiner—Gerald M. Forlenza
Assistant Examiner—George F. Abraham
Attorneys—F. H. Henson, E. P. Klipfel and D. F. Straitiff ABSTRACT: A manipulator arm is exemplified which employs externally at its joint a pair of parallel actuator links extending longitudinally between pivotal connections on adjacent rounded arm section ends that are coupled together for rolling motion of one of such ends on the other. Rotary actuation of the links about the pivotal connection on one arm section causes a greater rotary movement of the other arm section about such connection. Control and/or actuator lines extend longitudinally inside the arm; interconnected at the arm section joints via flexible sections snaked between the actuating links for constant length at all angular joint positions.

PATENTED OCT 5 1971 3,610,438

WITNESSES
Helen M. Farkas
James F. Young

INVENTOR
Everett W. Opdahl
BY D. L. Straitiff

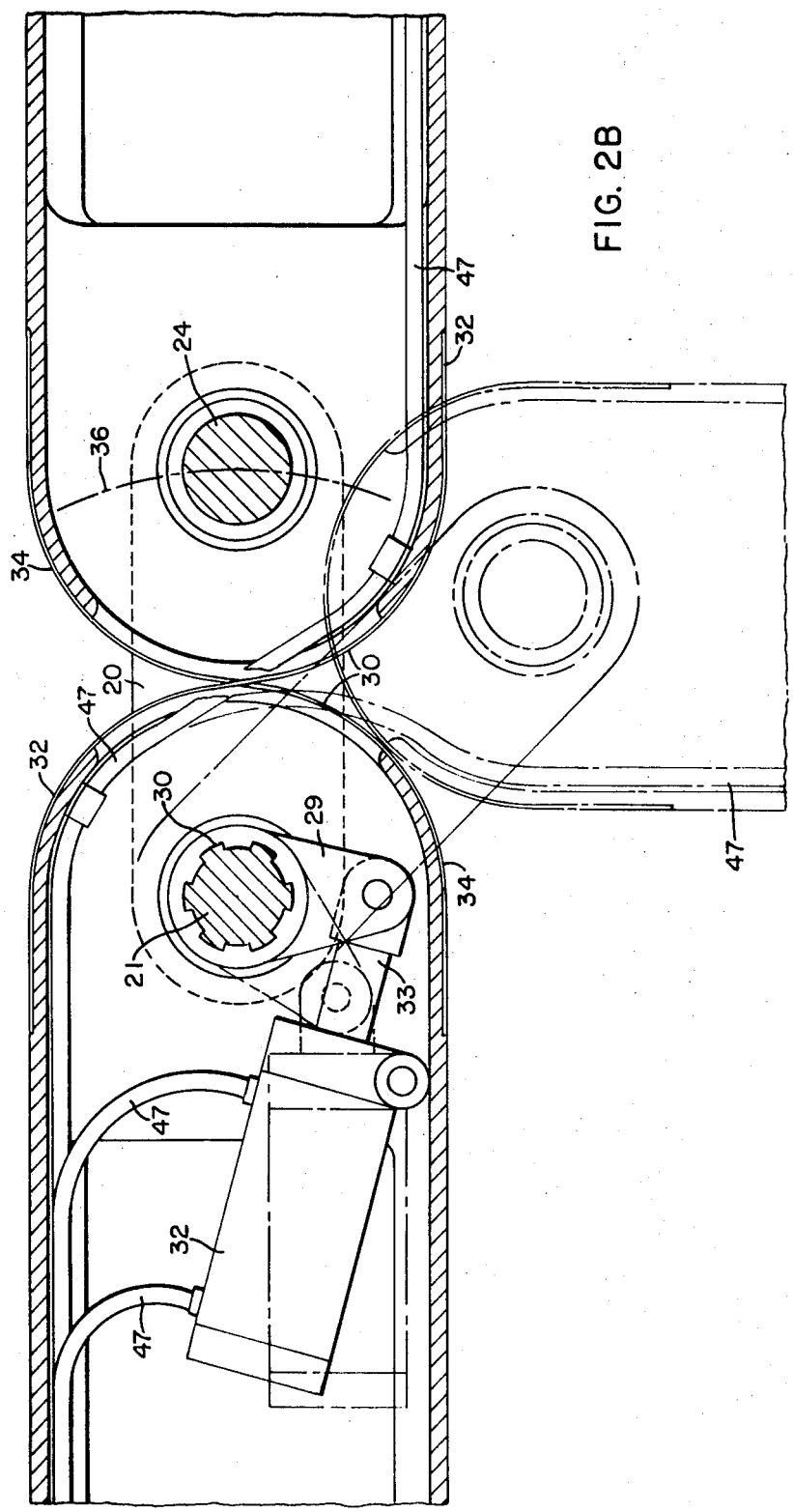

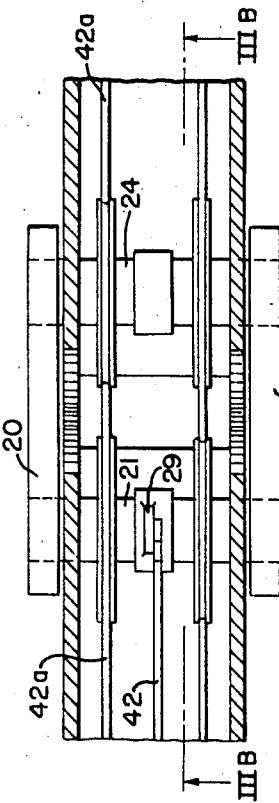
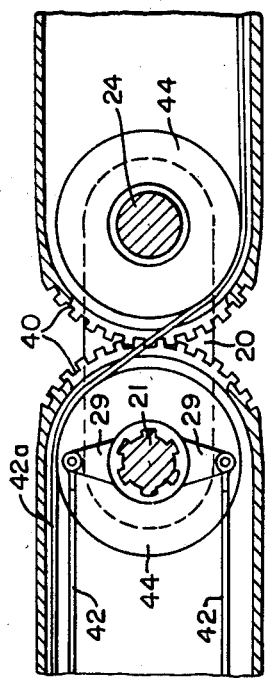
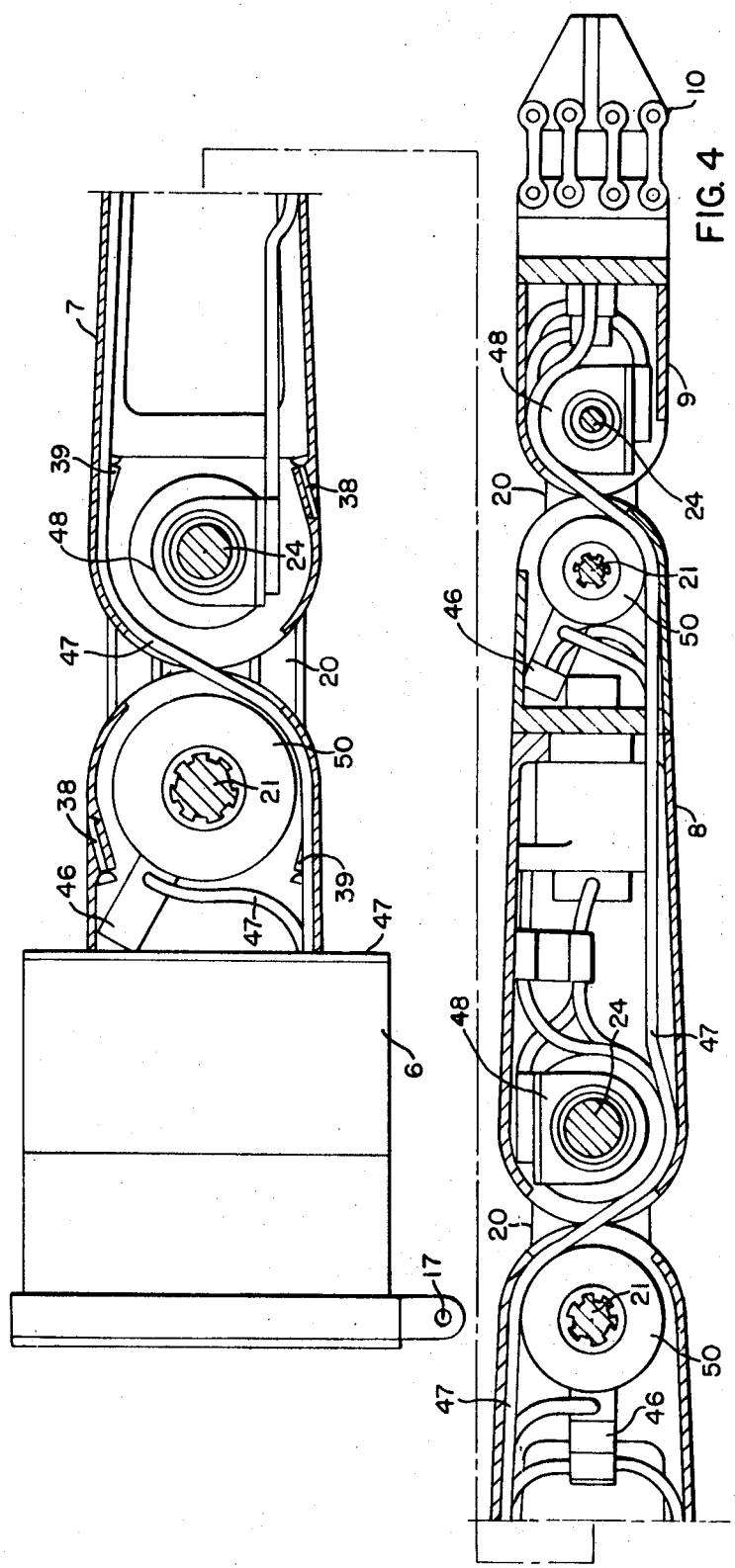

MANIPULATOR ARM

BACKGROUND OF THE INVENTION

1. Field of the Invention

Manipulator arms suited for use on undersea vehicles.

2. Description of the Prior Art

It is common practice in manipulator arm constructions for undersea use to employ a fork fitting or offset hinge at the arm section joints. In either case, it is difficult to pass control and/or actuator lines through the joints. If the lines are run externally, they are susceptible to damage or snagging unless shrouded, which is difficult to achieve.

In order to obtain joint motions in excess of 90°, rotary type hydraulic actuators have been employed, which are located directly at the pivot axes of the joints. This type of actuator installation also inhibits the passage of control and/or actuator lines therethrough.

Arm joint constructions which permit one arm section to fold back against another, heretofore have been difficult if not impossible to attain. A result has been that the degree of compaction of the arms during stowage has been undesirably limited, hence the arm storage demanded has been greater than desirable.

In certain existing arm joint constructions, actuators become exposed and/or protrude when the arm assumes a folded position. This makes them susceptible to damage when stowed externally of the vehicle and/or increases stowage volume requirements.

Still further, certain existing arm joint constructions result in inefficient use of their structural components, hence tend to contribute to increased weight due to larger size required to compensate for the inefficiency.

For light duty manipulators, it is desirable to locate the actuators at the shoulder arm section rather than at the joint being driven, since this reduces the parasitic weight which the arm must lift during its operation. It is difficult to provide for such remote actuation of the joints in previous arm constructions.

SUMMARY OF THE INVENTION

The present invention, in providing a manipulator arm construction in which the ends of arm sections at the joints are caused to roll about the ends of adjacent arm sections by angular movement of one end of pairs of actuator links disposed at opposite sides of the exterior of such arm, opportunity is afforded for readily overcoming the limitations of the prior art set forth in the preceding description of such prior art.

The externally situated actuator links, being pivotally connected at one end to one arm section and at its other end to the adjacent arm section affords longitudinal space between the two pivot locations to accommodate extension of S-shaped flexible control and/or actuator line sections that transfers itself by bending progressively onto one or the other arm section end without changing length during angular movement at the arm joints in one direction or the other. With the actuator links being disposed along the exterior of the arms at the joints, disposition of such lines within their protective confines is afforded.

By virtue of the rolling motion of one arm section end over the end of the adjacent arm section, angulation of the one section relative to the other to the extent of 180° for foldback is readily obtainable, and by virtue of obtaining such rolling motion by the turning of one end of the respective actuator link pair to obtain a multiplication of the resultant arm section movement, efficient use of rotary input motion is obtained.

By virtue of longitudinal separation between the input axis about which the rotary input motion occurs and the axis on which the actuated arm section turns, considerable choice of input motion actuator is afforded, including a hydraulic rotary actuator coaxial with such input axis, a local reciprocating piston actuator crank-arm-connected at such input axis, a remote actuator connected via cables in the arm to crank arms at such input axis, etc.

BRIEF DESCRIPTION OF THE DRAWING

FIG. 2B is a vertical view of the arm joint of FIG. 2A, taken along the section line IIB—IIB;

FIGS. 3A and 3B are views similar to FIGS. 2A and 2B, respectively, but employing a flexible cable actuation arrangement in lieu of the local reciprocating hydraulic actuator of the former, and FIG. 4 is a side elevation view, partly in outline and partly in section, showing the interior of a manipulator arm constructed in accord with the present invention as embodying rotary hydraulic actuators within the several arm sections for actuating its joints.

DESCRIPTION OF PREFERRED EMBODIMENTS

Figure 1:
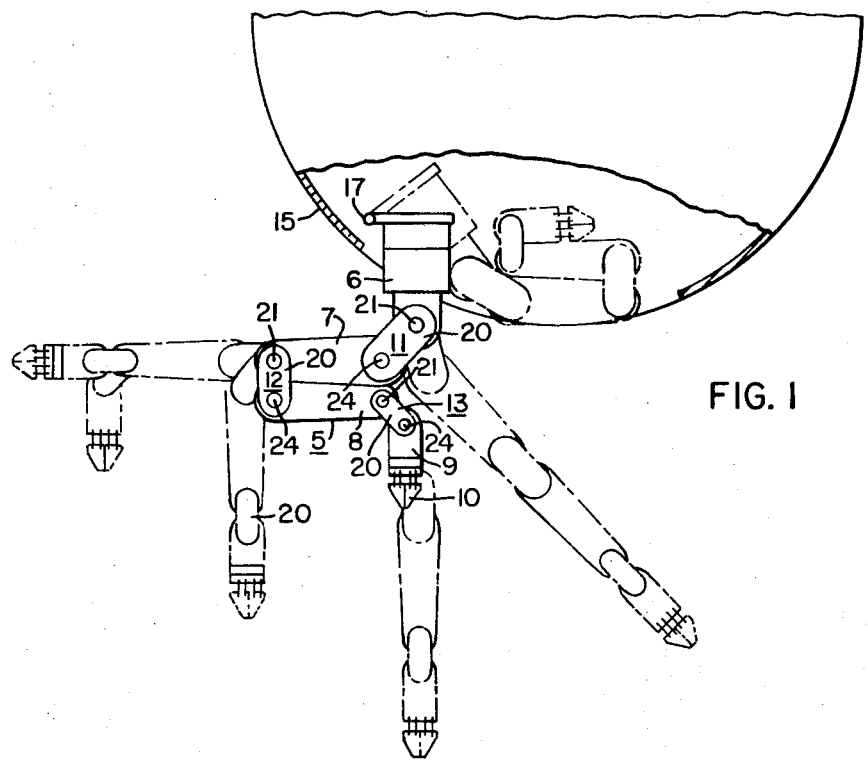
FIG. 1 is an elevation view showing schematically in outline a manipulator arm constructed in accord with the present invention as affiliated with an outer hull of an undersea vehicle; with various exemplied arm positions shown in dash outline.

Referring to FIG. 1, the manipulator arm 5, preferably comprises sections which generally correspond to sections of a human arm, as is common practice, and includes shoulder, upper arm, lower arm, wrist and hand sections 6, 7, 8, 9 and 10, respectively, articulated at shoulder, elbow and wrist joints 11, 12 and 13, respectively; the shoulder and wrist sections 6 and 9 also usually being rotatable selectable degrees. In accord with the present invention, the elbow and wrist joints 12 and 13 are capable of turning 180° relative to a straight arm attitude, in opposite directions, one joint relative to the other, to obtain the double foldback disposition of upper arm, lower arm and wrist sections 7, 8 and 9 for compact stowage within the outer hull 15 of an undersea vehicle 16, as well as to afford greater arm maneuverability during use. Relative to a straight attitude, preferred joint angulating capabilites are plus 90° and minus 90° for the shoulder joint 11, plus 180° and minus 0° for the elbow joint 12, and, plus 90° and minus 180° for the wrist joint 13. In additions it is desirable to pivotally support the shoulder section 6 at its upper end corner, as at point 17, within the hull 16 to facilitate introduction of the collapsed arm into such hull for stowage.

Figure 2A:
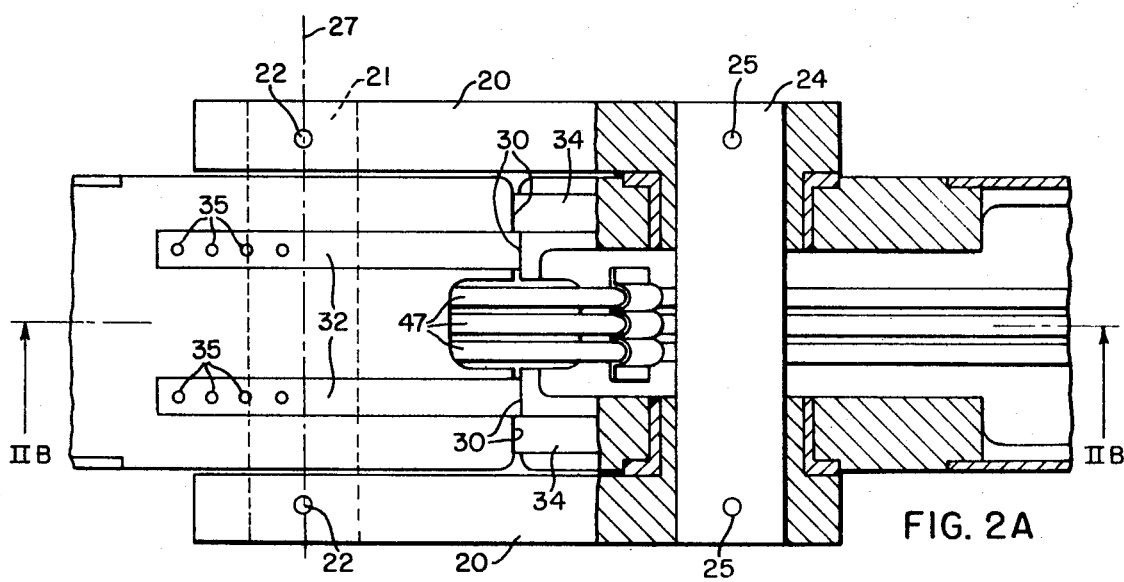
FIG. 2A is a top view of a novel joint construction embodied in the manipulator arm of the present invention as employing a local reciprocating hydraulic cylinder device for actuation.

Referring to FIGS. 2A and 2B, the joint construction employed in the manipulator arm of the present invention, employs a pair of parallel-arranged actuator links 20, disposed on the exterior of the arm at its opposite side edges and extending between adjacent arm section ends. One end of each pair of the actuator links 20 is spanned by a shaft 21 attached thereto via pins 22 and journaled in the one arm section near its end, and the opposite end of such actuator link pair is spanned by a second shaft 24 secured thereto via pins 25 and journaled in the adjacent arm section end. An input end of the pair of links 20 is adapted to be turned about the axis 27 of the shaft 21 by turning of such shaft via a crank arm 29 torque coupled to the shaft via such as splines 30 as shown in FIG. 2B. A hydraulic cylinder device 32, for example, having a piston rod 33 pivotally connected at its end to the end of crank arm 29 provides for actuation of the crank arm.

In accord with a feature of the present invention, the arm sections have rounded surfaces 30 at their adjacent joint ends which are concentric with the axes of the shafts 21 and 24 in such arm sections, respectively, between which a rolling motion occurs during turning of the respective pair of actuator links 20. As exemplified in FIGS. 2A and 2B, the rounded ends 30 of adjacent arm sections have a slight radial clearance therebetween to accommodate extension of two pairs of alike thin flexible metal straps 32 and 34 that are anchored by such as machine screws 35 at opposite ends to the two arm sections, respectively, and extend along the rounded surface 30 on one arm end to the point of closest proximity of such surface with the corresponding rounded surface 30 of the adjacent arm end, where such straps cross over onto such corresponding surface and continues therealong to its anchor location on such adjacent arm end. One pair of straps, straps 32, extends from the top of the one arm end to the bottom of the adjacent arm end, and the other pair of straps, straps 34, extends reversely, i.e., from the bottom of the one arm end to the top of the adjacent arm end. As the pair of actuator links 20 are caused to turn about the axis of the shaft 21, the straps 32 and 34 cause the end of the arm section containing the output shaft 24, to, in effect, roll around the end of the arm section containing the input shaft 21 as a reaction to such output shaft being carried by the pair of actuator links 20 along a circular path about the axis of the input shaft 21. During such "rolling" motion of the one arm section end over the other the straps transfer from rounded surfaces 30 of one to those of the other, as their crossover point moves along the rounded surface region of the one arm end corresponding to movement of their contact point if a true rolling action occurred between such rounded surfaces. In FIG. 4, flexible cables 38 and 39, shown partially at the shoulder joint, take the place of the straps 32 and 34 of FIGS. 2A and 2B and are similarly arranged to provide such rollinglike motion of the driven arm section end around the driving arm section end. In FIGS. 3A and 3B, rolling action is obtained by use of toothed segments 40 affiliated with the rounded ends of the adjacent arm sections to replace the straps and cables.

In accord with the operating principles of the foregoing arm joint construction, it will be apparent that the rolling motion action of one arm section end on the other, 180°turning of one section relative to the other, in either direction from an aligned attitude is readily obtainable. Furthermore, the angulation of the actuated arm section is multiplied relative to the input angulation of the pair of actuator links 20. Where, as exemplified in the several figures of the drawings, the radii of the rounded ends of adjacent arm sections of a given joint are equal, the degree of angulation of the driven arm section is double the angulation of the actuator link pair, hence double that of rotary movement of the input shaft 21, so that rotary input motion need be only 90°to obtain 180°of angulation of the driven arm section. This enables the input shaft 21 to be turned by crank arm 29 as in FIG. 2B operated by a linear hydraulic cylinder device 32, or by a pair of such crank arms, as in FIG. 3A 3B, where pulling on the ends of such crank arms via cables 42 provide for turning input shaft 21 in opposite directions form a remote actuator at the arm shoulder, for example. Other such cables 42a may pass along the arm to the crank arms at other arm joints and through the joints such cables are not required to operate, via cable guide pulleys 44, rotatable shafts 21 and 24, between which such cables snake between top and bottom to enable transfer therebetween during turning of joint without affecting cable length.

In the arrangements, as in FIGS. 2A, 2B and Fig. 4, where hydraulic actuators in one form or another are mounted inside the driving arm sections for actuation of the input shafts 21 of respective link pairs 20, hydraulic lines 47 for operation of the actuators, and electric lines for electrohydraulic servo valves 46 controlling actuator operation, and/or for driven arm section angular position information furnished by potentiometers 48, extend along inside the arm sections from the shoulder 6 and pass through the joints by snaking upwardly and/or downwardly between the actuator link 20 pairs which protect them against snagging and damage.

In FIG. 4, the hydraulic actuators 50 are of the rotary vane type of generally cylindrical configuration arranged concentrically around the input shafts 21 and having the moving vane or vanes thereof directly attached thereto.

I claim:

1. A manipulator arm having an upper arm section joined to a lower arm section at an elbow joint and a hand-carrying wrist section joined to said lower arm section at a wrist joint, both joints being capable of angulation sufficient to enable simultaneous doubling back of said lower arm section onto said upper arm section and of said wrist section onto said lower arm section for compact stowage, each joint comprising, a pair of parallel actuator links extending along the exterior of the arm between the adjacent arm section ends, an input shaft extending between and secured to said links at one end and journaled in the driving one of the adjacent arm section ends, an output shaft extending between and secured to said links at their opposite end and journaled through the driven one of such adjacent arm section ends, the immediately adjacent portions of such arm section ends having rounded surfaces disposed oppositely between said links and between the input and output shafts relative to which such surfaces are concentric, respectively, coupling means affiliated with said rounded surfaces to obtain a rollinglike motion therebetween in response to angular movement of said actuator links about the axis of said input shaft, and actuator means for effecting turning of said input shaft.

2. The manipulator arm of claim 1, wherein said actuator means is a hydraulic actuator device mounted in the respective arm section adjacent to said input shaft.

3. The manipulator arm of claim 1, wherein lines for said actuator means extend through the interior of said arm and have at least flexible sections extending longitudinally and vertically between adjacent arm section ends within the confines of said parallel actuator links at the arm joints.

4. The manipulator arm of claim 1, wherein said coupling means is in the form of flexible elements anchored at opposite ends to the adjacent arm section ends, respectively, and extending from the top of one arm section end to the bottom of the other.

5. The manipulator arm of claim 1, wherein said coupling means is in the form of gear teeth disposed along said rounded surfaces.